April 7, 1931. V. J. BURNELLI 1,799,777
AIRPLANE
Filed Nov. 19, 1927
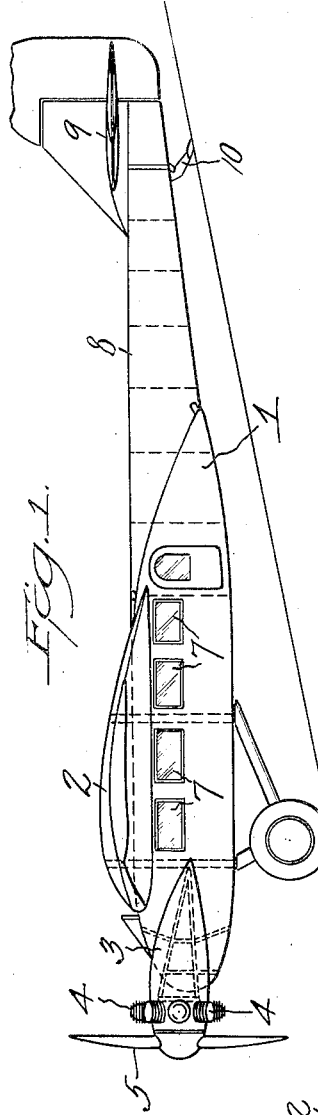
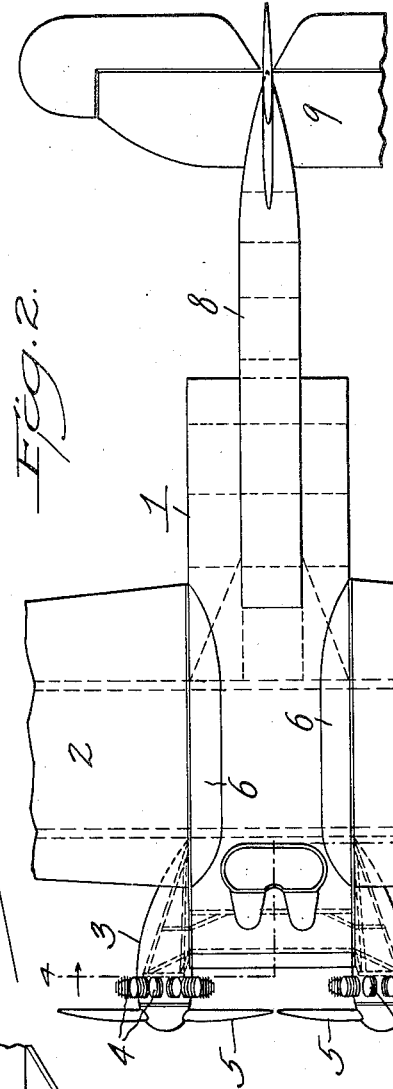
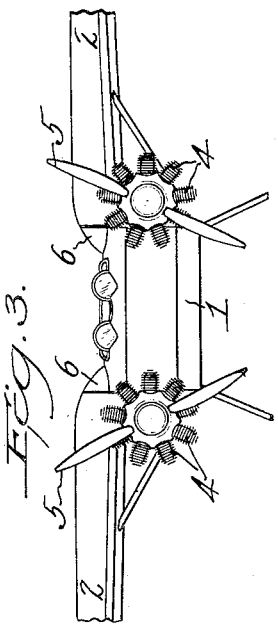
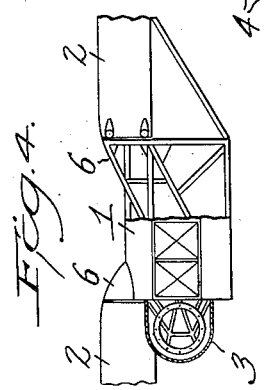

Patented Apr. 7, 1931

1,799,777

UNITED STATES PATENT OFFICE

VINCENT J. BURNELLI, OF NEW YORK, N. Y., ASSIGNOR TO THE UPPERCU-BURNELLI CORPORATION, A CORPORATION OF DELAWARE

AIRPLANE

REISSUED

Application filed November 19, 1927. Serial No. 234,320.

This invention relates to airplanes and my improvements are directed to certain novel structural features involving the fuselage with respect to its means of supporting connection with the power plant, the airplane wings and the tail group.

Thus one object of my invention is to provide lateral, forwardly projecting extensions of the fuselage which are adapted to support engines mounted thereby at opposite sides of the fuselage nose. It is by these means that two engines carried by a fuselage at opposite sides of the centre of resistance through the airplane may operate respective propellers, in advance of the fuselage nose, in the same vertical plane in instances where the normal width of the fuselage would not permit sufficient spacing between propeller centres if the engines were contained within the fuselage.

Another object of my invention is to secure the opposite monoplane wings to the upper sides of the fuselage, giving said wings each a shoulder effect where they are rooted to the fuselage to thus leave exposed the side walls of the fuselage so that windows in said walls will be available to passengers in the fuselage for observation purposes, without resorting to wing distortion.

Still another object of my invention is to provide a relatively narrow, hollow rearward extension from the fuselage to serve as a support for the empennage or tail group and the tail skid, this feature being particularly desirable when the fuselage is of considerable width and is not itself extended in length to tail group.

Other features and advantages of my invention will hereinafter appear.

In the drawing:

Figure 1 is a side elevation of an airplane containing the several features of my invention.

Fig. 2 is a top plan view thereof, the wings being broken away.

Fig. 3 is a partial front elevation of the same, and

Fig. 4 is a section on the line 4—4 of Fig. 2.

In said figures let 1 indicate an airplane fuselage and 2, 2, a pair of monoplane wings extended therefrom.

Attached to the opposite sides of the fuselage and extending forwardly thereof are the structures 3, 3 which each constitute a support for an engine. In the example of the drawing the engines 4, 4 are shown as of the radial, air cooled type, but obviously other types of engines may equally well be mounted upon or contained within the structures 3, 3, whose main purpose is to support the engines at the sides of the fuselage with the propellers projecting forwardly of the fuselage nose.

The disposition of the propellers 5, 5 which are operated by the engines 4, 4 is such that they may rotate clearingly in the same vertical plane. Rooted to and extending upwardly from the top sides of the fuselage are the wing shoulders 6, 6 and it is from these shoulders that the wings 2, 2 are spanned outwardly, said wings thus lying in an approximately horizontal plane that is elevated above the fuselage top to thereby expose windows 7 in the fuselage sides, whereby the said windows may be disposed at suitable height from the fuselage floor, permitting passengers seated in the fuselage to have full and unobstructed view through the windows.

When the fuselage is of considerable width and does not extend rearwardly to itself serve as the support for the empennage and tail skid, I provide a hollow, bulkheaded extension 8, suitably connected to the fuselage and of relatively narrow width, substantially as shown, the length of said extension enabling it to support the empennage 9 and also to carry the tail skid 10.

It will be noted that the upward projection of the wing roots above the fuselage top defines a channel or concaved effect between said wing roots and fuselage top that tends to diminish head resistance.

This application is a continuation in part of my application Serial No. 435,481 filed January 6, 1921.

Variations within the spirit and scope of my invention are equally comprehended by the foregoing disclosure:

I claim:

1. The combination with an airplane fuselage of a pair of engine mountings attached respectively to opposite outer side walls of said fuselage, and projecting forwardly thereof, said mountings constituting a part of the fuselage structure, and being accessible from the fuselage interior.

2. The combination with an airplane having monoplane wings and a fuselage of a pair of engine mountings attached respectively to opposite outer side walls of said fuselage and projecting forwardly thereof, said mountings constituting a part of the fuselage structure, and engines carried by said mountings and being accessible from the fuselage interior.

New York, November 16th, 1927.

VINCENT J. BURNELLI.